United States Patent [19]
Callender et al.

[11] Patent Number: 5,828,981
[45] Date of Patent: Oct. 27, 1998

[54] GENERATING PORE TYPES AND SYNTHETIC CAPILLARY PRESSURE CURVES FROM WIRELINE LOGS USING NEURAL NETWORKS

[75] Inventors: Christie Ann Callender; James Joseph Funk, both of Houston; Cynthia Marie Ross, Bellaire; John Benjamin Turbeville, Jr., Houston, all of Tex.

[73] Assignee: Texaco Inc., White Plains, N.Y.

[21] Appl. No.: 439,343

[22] Filed: May 11, 1995

[51] Int. Cl.⁶ ........................................................ G01V 1/48
[52] U.S. Cl. ............................ 702/6; 702/11; 702/12; 706/928; 706/929; 73/152.02; 73/152.07; 73/152.11
[58] Field of Search ....................... 73/152.07, 152.02, 73/152.11, 152.06, 152.16; 364/422, 421, 578; 395/928, 929, 22–24; 250/255, 256, 262, 264, 265, 269.1, 269.2; 382/109; 702/6, 9, 11–13; 706/20, 22, 25, 21, 928, 929

[56] References Cited

U.S. PATENT DOCUMENTS

| | | | |
|---|---|---|---|
| 5,251,286 | 10/1993 | Wiener et al. | 364/422 |
| 5,300,770 | 4/1994 | Allen et al. | 364/422 |
| 5,444,619 | 8/1995 | Hoskins et al. | 364/421 |

*Primary Examiner*—Hal D. Wachsman
*Attorney, Agent, or Firm*—Henry H. Gibson; William J. Beard

[57] ABSTRACT

Methods of directly analyzing wireline well logging data to derive pore types, pore volumes and capillary pressure curves from the wireline logs are disclosed. A trained and validated neural network is applied to wireline log data on porosity, bulk density and shallow, medium and deep conductivity to derive synthetic pore type proportions as a function of depth. These synthetic data are then applied through a derived and validated capillary pressure curve data model to derive pore volume and pressure data as a function of borehole depth.

14 Claims, 8 Drawing Sheets

GENERATING PORE TYPES AND SYNTHETIC CAPILLARY PRESSURE CURVES FROM WIRELINE LOGS USING NEURAL NETWORKS

FIELD OF THE INVENTION

This invention relates to improved methods for analyzing wireline well logging data to derive therefrom synthetic pore types and capillary pressures. More particularly, the synthetic pore types and capillary pressures so derived provide improved estimates of formation permeability, water saturation and improved reservoir simulation models. These features are accomplished through the use of Neural Networks designed and trained for this purpose using actual well logging data and core samples from a geographical region.

BACKGROUND OF THE INVENTION

Existing methods for determining capillary pressure curves involve laboratory measurements of this parameter. Capillary pressure is typically measured by first saturating a core sample with a wetting phase such as air or brine. Then a non-wetting phase such as mercury or oil is injected into the core sample to displace the wetting phase as the pressure required for displacement is increased. The saturation of the core sample by the non-wetting phase at each increased pressure increment then provides a direct physical measurement of the capillary pressure curve of the core samples. This process is repeated at different borehole depths using core samples from each depth.

It is apparent that the foregoing process is very tedious, expensive and time consuming, and would be prohibitively so, if performed for each well drilled in developing an oil field. Wireline logging measurements, on the other hand, are non-destructive, repeatable, and speedily performed in comparison to the coring and measuring sequence described above. It is only a matter of a few hours work, usually, to perform wireline logs of any new well drilled in a field being developed. It would certainly be advantageous to be able to derive capillary pressure curves and/or generate synthetic pore types representative of each new well without actually coring and measuring the well. This desirable result is made possible by the present invention employing Neural Networks for the analysis of the wireline logging measurement parameters of gamma ray activity, shallow, medium and deep conductivity, neuron porosity, and bulk density measurements and acoustic travel time or acoustic porosity over an interval.

BRIEF DESCRIPTION OF THE INVENTION

A new method for generating capillary pressure curves has been developed using carbonate hydrocarbon reservoir rocks. This method combines image analysis of core samples, special core analysis techniques and the use of a trained Neural Network to produce a novel technique for modeling capillary pressure behavior. The novel method can be applied to both carbonate and clastic reservoirs.

In the novel methods as developed herein distinct pore types are identified using thin section based image analysis. These thin sections are used to characterize the porosity in the samples. Proportions of pore types for study were regressed against measured saturation values from capillary pressure curves. The resulting collection of regression equation serves as the synthetic capillary pressure model.

Pore type proportions along with core porosity and permeability are identified as discrete points associated with distinct wireline log response intervals. These are then entered as criteria to "train" the Neural Network system. The Neural Network end results include prediction of pore type proportions continuously with depth, predictions of synthetic capillary pressure curves in a continuous manner and estimates of porosity and permeability. This method of capillary pressure prediction provides a modeled or synthetic capillary pressure curve for each wireline log measurement instead of having to run the previously described laboratory capillary pressure tests. A field wide useful Neural Network model provides continuous downhole capillary pressure curve estimates without the actual coring and laboratory capillary pressure tests. The pore type proportions predicted in this manner from the wireline logs can also be used to zone reservoir intervals.

BRIEF DESCRIPTION OF THE DRAWING

The foregoing features and advantages of the improved methods of wireline well log analysis will become more apparent from the following detailed description thereof when taken in conjunction with the accompanying drawings, in which.

DESCRIPTION OF THE PREFERRED EMBODIMENT

Figure 1:
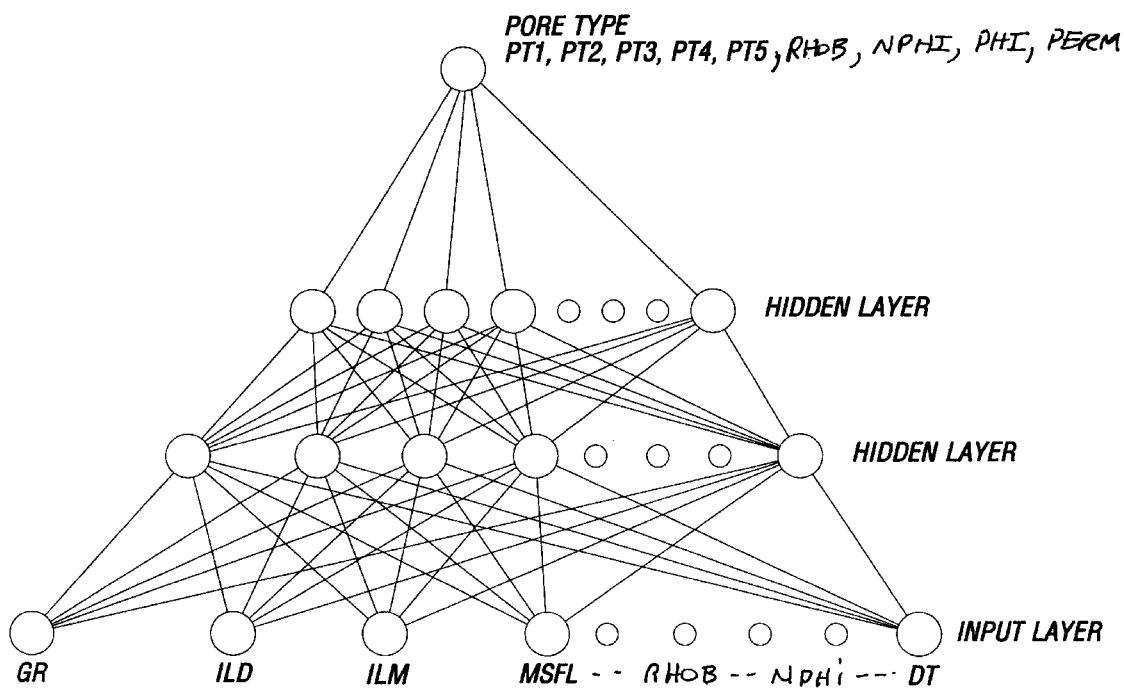
FIG. 1 is a schematic representation of the Neural Network architecture according to concepts of the invention.

In the present invention accurate determination of formation permeability, porosity, pore types and capillary pressure curves from wireline well logs are obtained through the use of neural networks. Referring first to FIG. 1 a neural network is designed having four layers: 1) an input layer of wireline log parameters, for example GR (gamma ray), ILD (deep induction log), ILM (medium induction log), MSFL (shallow conductivity by micro spherically focused log), RHOB (bulk density by gamma ray scattering), NPHI (neutron porosity) and DT (acoustic travel time): 2) a first hidden layer; 3) and an optional second hidden layer and 4) an output layer of pore types PT1, PT2, PT3, PT4, PT5 (defined below) porosity, permeability and RHOB and NPHI, the latter two input parameters appearing in the output layer as quality checks. The pore types PT1, PT2, PT3, PT4 and PT5 are defined in Table I below.

TABLE I

| Pore Type | Rock Type | Diagenesis Indicator | Porosity Description | SEM-IA Geometry |
|---|---|---|---|---|
| PT1 | Dolomitic Wackestone | Leaching of micrite matrix | Microporosity | 5.08µ; isolated pores |
| PT2 | Grainstone and Wackestone | Isopachous calcite cement (grainstone) and leached grains (wackestone | Small, elongate intergranular and leached pore space | 11.13µ; poorly connected, slightly elongate pores |
| PT3 | Dolomite | Leached calcite grains; pore space was then compacted | small, elongate (compacted) leached pore space | 22.09µ; fairly well connected elongate pores |
| PT4 | Packstone/ Grainstone | Enhanced intergranular porosity (dissolution) | Large, well connected intergranular pore space | 82.9µ; well connected elongate pores |
| PT5 | Packstone/ Grainstone | Enhanced intergranular | Very large, well connected | 197.98µ; well |

TABLE I-continued

| Pore Type | Rock Type | Diagenesis Indicator | Porosity Description | SEM-IA Geometry |
|---|---|---|---|---|
| | | porosity (dissolution) | intergranular space, but can occur as vugs | connected, but can occur as isolated pores |

In the neural network of FIG. 1 each of the four layers are fully interconnected with each other. The network contains 7 input neurons (processing elements), 28 hidden layer processing elements in two layers of fourteen each, and 9 output neurons corresponding to those shown in FIG. 1. While this particular configuration is given here as an example, it will be appreciated by those skilled in the art that other network design variations could be used, if desired, without departing from the true spirit and scope of the invention. The discussion of this particular neural network design and result is intended as illustrative only. This particular neural network design can be summarized in Table II below. It will be understood by those skilled in the art that this neural network can be implemented by programming a small general purpose computer or PC for that purpose as desired. Any Intel 80486 or Pentium based processor having suitable random access memory (RAM) and/or extended RAM hard drive could be used for this purpose and carried on a wireline logging truck to give onsite well log analysis, if desired.

TABLE II

| | Neurons | | | |
|---|---|---|---|---|
| Log Types | INPUT 7 | HIDDEN 28 | OUTPUT 9 | PREDICTED VARIABLES |
| GR | x | | x | Core porosity |
| Log 10(1LD) | x | | x | log10 (Permeability) |
| Log 10 (1LM | x | | x | PT1 |
| Log 10 (MSFL | x | | x | PT2 |
| DT | x | 28 x | x | PT3 |
| RHOB | x | | x | PT4 |
| NPHI | x | | x | PT5 |
| | | | x | RHOB (Quality Check) |
| | | | x | NPHI (Quality Check) |

Given the output variables of Table II synthetic capillary pressure curves may be calculated from the neural network derived pore types using a synthetic capillary pressure model defined in Table III.

TABLE III

| | Pressure Range (psi) | Throat Size (µ) | Regression Coefficient for Δ Saturation Prediction | | | | |
|---|---|---|---|---|---|---|---|
| | | | PT1 | PT2 | PT3 | PT4 | PT5 |
| P1 | 0–3 | >60.27 | | | | | 0.1226 |
| P2 | 3–3.97 | 45.54–60.27 | | | | 0.0315 | 0.0664 |
| P3 | 3.97–5.45 | 33.18–45.54 | | | | 0.0757 | 0.1056 |
| P4 | 5.45–8.43 | 21.45–33.18 | | | | 0.3105 | 0.1050 |
| P5 | 8.43–10.43 | 17.34–21.45 | | | | 0.2050 | 0.0249 |
| P6 | 10.43–13.01 | 13.90–17.34 | | | 0.0657 | 0.0855 | 0.0344 |
| P7 | 13.01–59.99 | 3.03–13.90 | | | 0.5080 | 0.0828 | 0.1519 |
| P8 | 59.99–89.74 | 2.02–3.02 | | | 0.1157 | | 0.0251 |

TABLE III-continued

| | Pressure | Throat Size | Regression Coefficient for Δ Saturation Prediction | | | | |
|---|---|---|---|---|---|---|---|
| | Range (psi) | ($\mu$) | PT1 | PT2 | PT3 | PT4 | PT5 |
| P9 | 89.74–328.5 | 0.55–2.02 | | 1.1698 | | 0.1632 | 0.1180 |
| P10 | 328.5–5586.47 | 0.03–0.55 | | | 0.2900 | 0.0247 | 0.1486 |
| P11 | 5587.47–60000 | 0.003–0.03 | 0.8185 | | | 0.0167 | 0.0928 |
| sum of the proportion of each pore type filled (average = 0.99) | | | 0.8185 | 1.1698 | 0.9794 | 0.9956 | 0.9958 |

This synthetic capillary pressure model may, of course, be programmed into the same general purpose data processor as that used for the neural network determination according to the design of Table II, and hence, if desired, could be provided as a function of depth in the well whose log data is simultaneously processed by the neural network of Table II as an additional output.

Before running the neural network defined by Table II on unknown, appropriately scaled input wireline log data, the neural network must be appropriately "trained". During the "training" the neural network is given the input wireline log data for a known well, asked to analyze it, and to predict the output variables of Table II. The predicted values of variables are then compared with the measured values of the same variables from the known well. The weight or weighting function $W_j o$ to $W_j n$ shown in FIG. 2 for a typical processing element are then adjusted to minimize a Global Error function (E) and the process repeated iteratively until satisfactory minimization of the error function is achieved.

Figure 2:
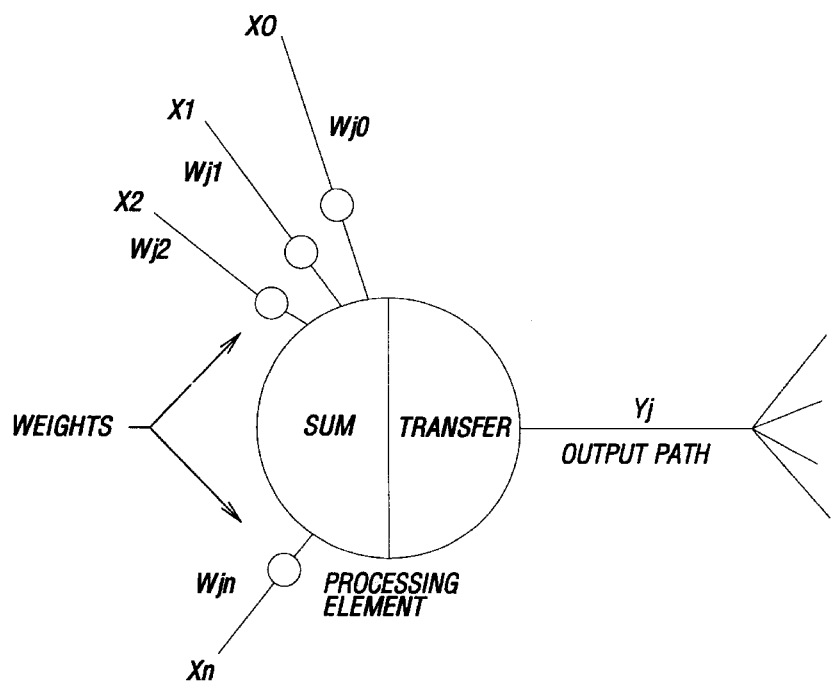
FIG. 2 is a schematic diagram of a single neural network processing element.

Referring to FIG. 2 a typical hidden layer processing element (neuron) of a neural network is shown. Each hidden layer neuron receives inputs $X_o$ to $X_n$ from each neuron in the layer preceding it on input lines via a weighting function or coefficient $W_j o$ to $W_j n$. The weights $W_j o$ to $W_j n$ are then adjusted by the technique known as back propagation.

In the back propagation technique the responsibility for reducing output error is shared among all connection weights in the network. The well known Delta Learning Rule is used for weight adjustment during "training". The Global Error function to be minimized is defined as:

$$E = 0.5 \; \Sigma_v (D_k - O_k)^2 \quad (1)$$

where the subscript k refers to the kth output mode, $D_k$ is the desired output and $O_k$ is the actual output from the Kth output node of the model.

The Global Error is then redistributed throughout the network according to Equation 2.

$$E_j^{(s)} = F'(I_j^{(s)}) \Sigma_k \; (E_k^{(s-1)} \cdot W_{kj}^{(s-1)}) \quad (2)$$

is the local error assigned to the jth node in the sth layer. The connection weights are then adjusted according to Equation (3)

$$\Delta W_{ji} = \text{lcoef} \; E_j^{(s)} \cdot X i^{(s)} \quad (3)$$

where 0<lcoef<1 is the "learning coefficient". The connection weight values at the end of the iterations for training determine the quality of the "trained" neural network for the analysis.

Figure 3:
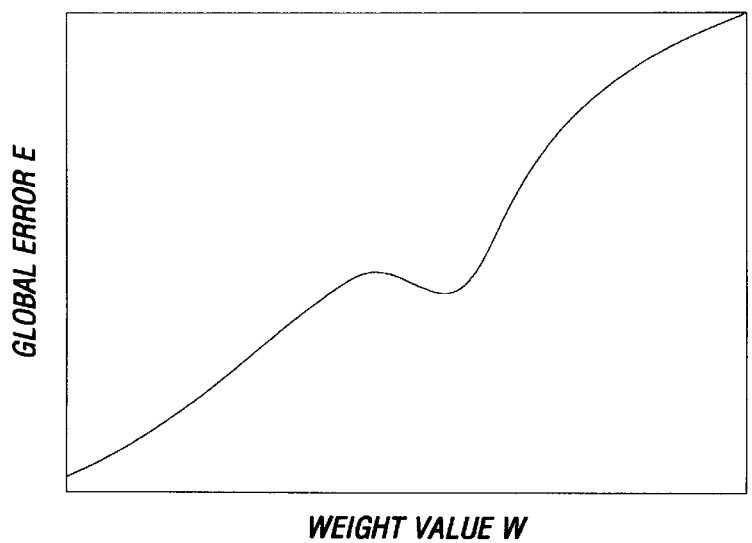
FIG. 3 is a graphical representation showing the Global Error (E) function in neural network processing element connection weight space.
Figure 4:
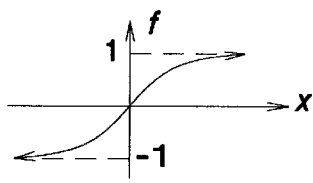
FIG. 4 is a graphical representation showing a non-linear transfer function (hyperbolic Tangent) used in connection with changing weighting coefficients in the neural networks.

Using Equations (1), (2) and (3) above and a functional form (see FIGS. 3 and 4 showing a hyperbolic Tangent function as an approximate functional form for the Global Error function of FIG. 3 and for the transfer function of FIG. 2) the weight vectors Wj can be adjusted to minimize the Global Error function E.

The network operates by first calculating an output vector from a given input vector based on the technique for data flow as outlined in FIG. 2. This output vector is compared to a desired output vector in order to determine the Global Error of the network. The definition of the local error at a processing element is then used to calculate the error associated with each processing element in the output layer. Using equation (2) this error is "back propagated" through the entire network so that, with the exception of those processing elements in the input layer, a value of local error is assigned to each processing element in the network. With the local error defined, the weight matrix is updated using equation (3). This process is carried out for each input-output pair in the training data set in an iterative sense until the Global Error of the network drops below some acceptable threshold value. This process is known as "training" the network.

When "training" is complete, the network is tested on data that is not part of the training set, but whose output is known to determine the reliability of the network.

The gradient descent approach to minimizing the function E is susceptible to local minima in E. There are several ways to avoid being trapped in an invalid local minimum of E. One way works by simply adding to the right hand side of Equation (3) above a term of the form b. $\Delta(W_p)_{ji}^{(s)}$ where $\Delta(W_p)_{ji}^{(s)}$ is the data weight calculated in the previous iteration and b is a user defined momentum coefficient. Clearly such a term acts to reduce the possibility of becoming stuck in a purely local minimum that could reside on the side of a steep slope of the function E as plotted in weight space (FIG. 3). Also the addition of such a "momentum" term can decrease the convergence time for a given learning coefficient.

A second concern in "gradient descent" is that by updating the weights after a single input-output pair has been presented that the error with respect to that pair is reduced but the error associated with other pairs in the training set is not reduced. For this reason cumulative update of weights can be used. That is, the delta weights for a user definable number of input-output pairs are added, and the actual update of the weights occurs only after this user definable number of pairs has been presented to the network.

Training of the network proceeds in this manner until the difference between the predicted and actual pore types, porosities and permeabilities reaches an acceptable tolerance. Approximately 100,000 passes or iterations of the training data has been found to give acceptable results.

The method for the training of a neural network to predict pore types PT1–PT5, capillary pressures as a function of depth, and porosity and permeability thus involves both laboratory measurements and the use of the Neural Network. An outline of the procedures for this is given in Table IV below.

TABLE IV

| STEPS | PROCEDURES |
|---|---|
| | Data Preparation |
| 1 | Select samples that represent all lithological variation and all distinct wireline log response intervals. Core samples should have porosity, permeability and capillary pressure data. |
| | Image Analysis and Pore Type Classification |
| 2 | Digitize and image analyze 2-D pore size and shape from thin section images generated in scanning electron microscope, energy dispersive spectrometer or a petrographic microscope. |
| 3 | Determine the number, proportion and size of pore types required to classify the samples. |
| | Pore Type-based Capillary Pressure Model |
| 4 | Using actual capillary pressure measurements, relate the change in saturation between pressure inflection points to pore type proportions using multiple regression analysis. |
| 5 | Develop and validate a capillary pressure model by selecting an appropriate regression equation for each pressure interval. The regression equation must be statistically valid, it cannot have negative regression coefficients, and the pore types cannot be smaller than the throat size calculated for the pressure interval. The average filled amount of each pore type should approach 100%. |
| 6 | Validate the model accuracy using samples which were not included in the model-building suite. |
| | Neural Network Training Procedures |
| 7 | Prepare wireline log data for neural network training program (depth align with core data). |
| 8 | Enter training set composed of measured core porosity, core permeability, and pore type proportions at their appropriate log depth (also quality control data, in this case, formation density and neutron porosity). |
| 9 | Train the neural network for pore type proportion, porosity, permeability prediction from wireline log data (back propagation) using 100,000 iterations. |
| 10. | Validate the neura; network predictive capabilities using<br>• correlation coefficients of predicted and measured values,<br>• cross plots of predicted vs. measured values, and<br>• comparisons of predicted values and measured values that were not included in the training set. |
| | Synthetic Capillary Pressure Curves |
| 11 | Apply the pore type proportions, predicted from neural network, to the capillary pressure model:<br>• Multiply each pore type proportion by its regression coefficient from the model for the first pressure interval<br>• Sum the resulting values for the first pressure interval<br>• Repeat this step for each subsequent pressure interval<br>• Convert the values for each pressure interval to cumulative saturation from beginning with the lowest pressure interval and ending at the highest pressure interval. |
| 12 | Plot pressure intervals and predict cumulative saturation values for a synthetic capillary pressure curve. |
| | Reservoir Zonation Using Neural Network-derived Pore Types |
| 13 | Multiply the predicted pore type proportions by the predicted porosity. |
| 14 | Plot the resulting predicted pore type volume by depth |
| 15 | Zone the reservoir intervals according to pore type assemblages. For instance, zones with high volumes of pore type 5 are one type of interval. |

Figure 5:
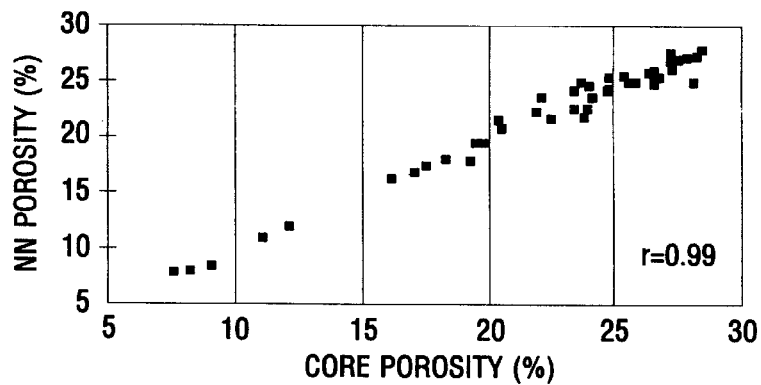
FIG. 5 is a graphical cross plot showing measured core porosities vs porosities derived from a trained neural network according to the invention.
Figure 6:
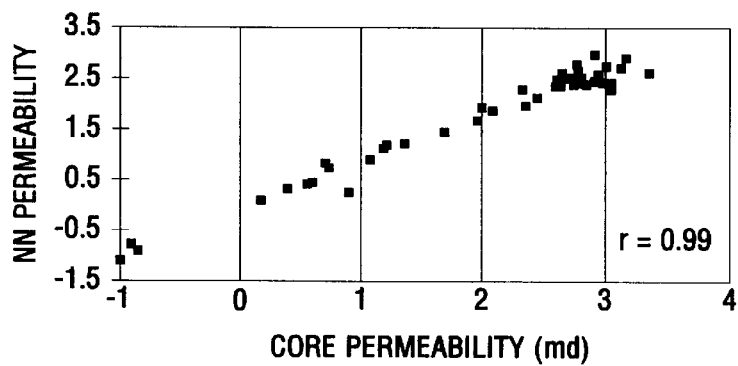
FIG. 6 is a graphical cross plot showing measured core permeabilities vs. permeabilities derived from a trained neural network according to the invention.
Figure 7:
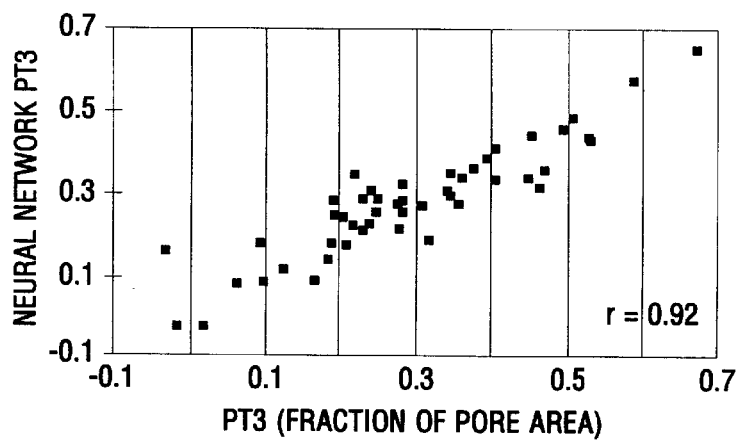
FIG. 7 is a graphical cross plot showing measured pore type PT3 samples vs. pore type PT3 selected by a trained neural network according to the invention.
Figure 8:
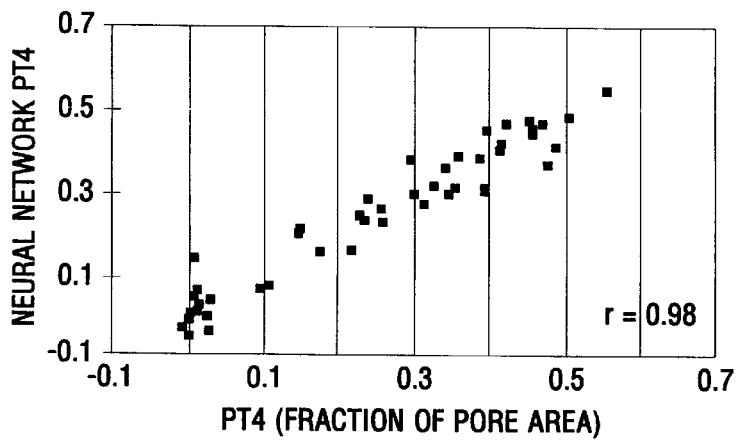
FIG. 8 is a graphical cross plot showing measured pore type PT4 samples vs. pore type PT4 selected by a trained neural network according to the invention.
Figure 9:
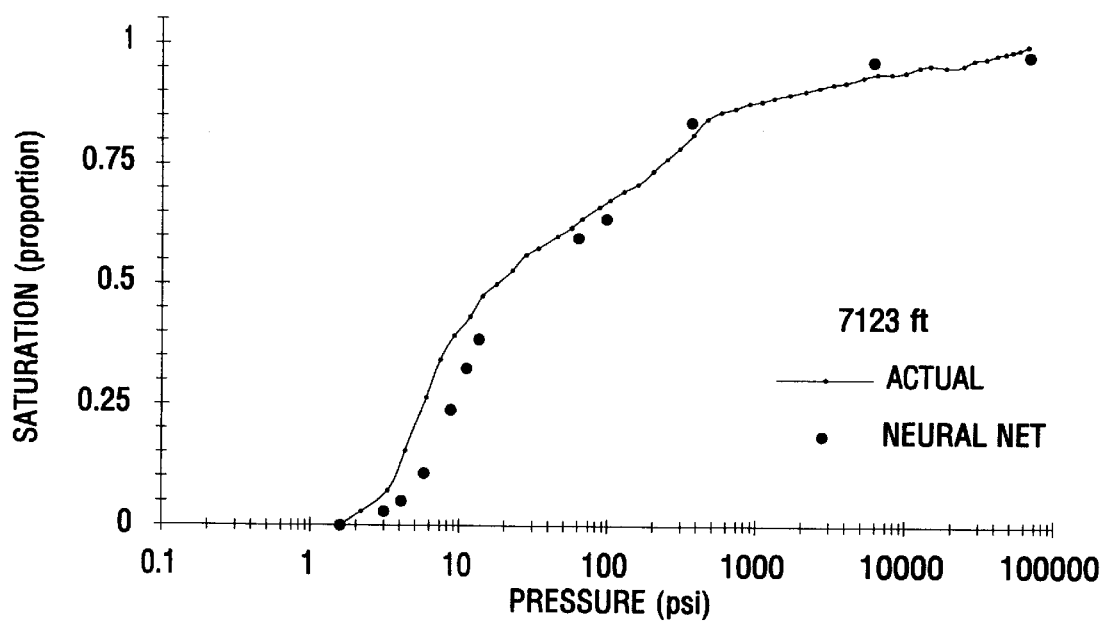
FIG. 9 is a graphical representation at a depth of 7123 ft. in a drilled well showing the fit between laboratory measured and neural network derived capillary pressure curves for core samples used to train the neural network.
Figure 10:
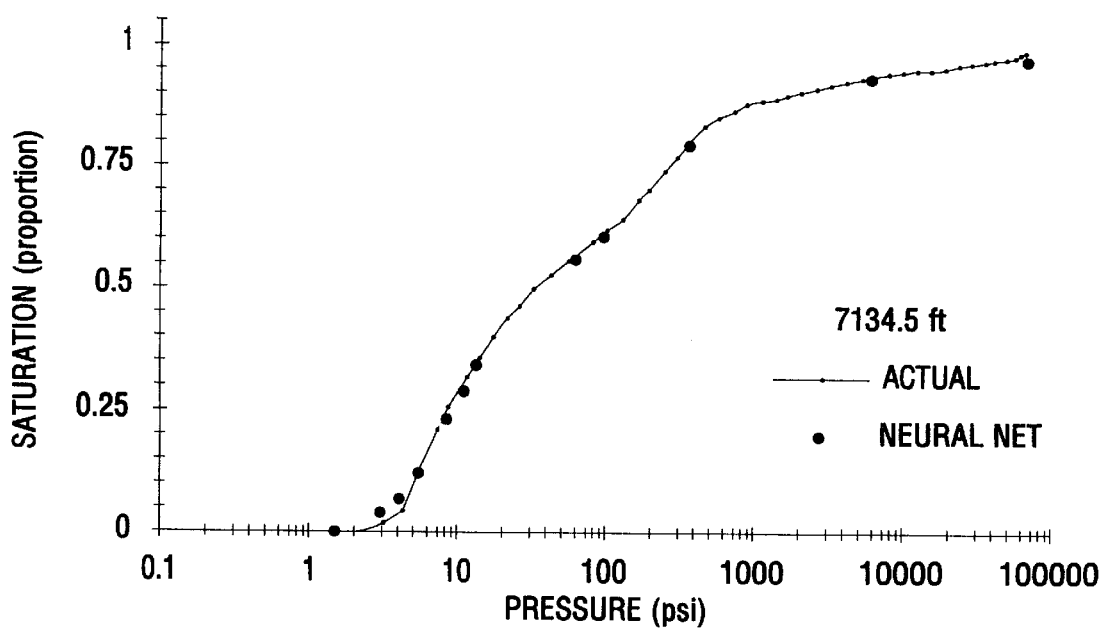
FIG. 10 is a graphical representation at a depth of 7134.5 ft. in a drilled well showing the fit between laboratory measured and neural network derived capillary pressure curves for core samples used to train the neural network.
Figure 11:
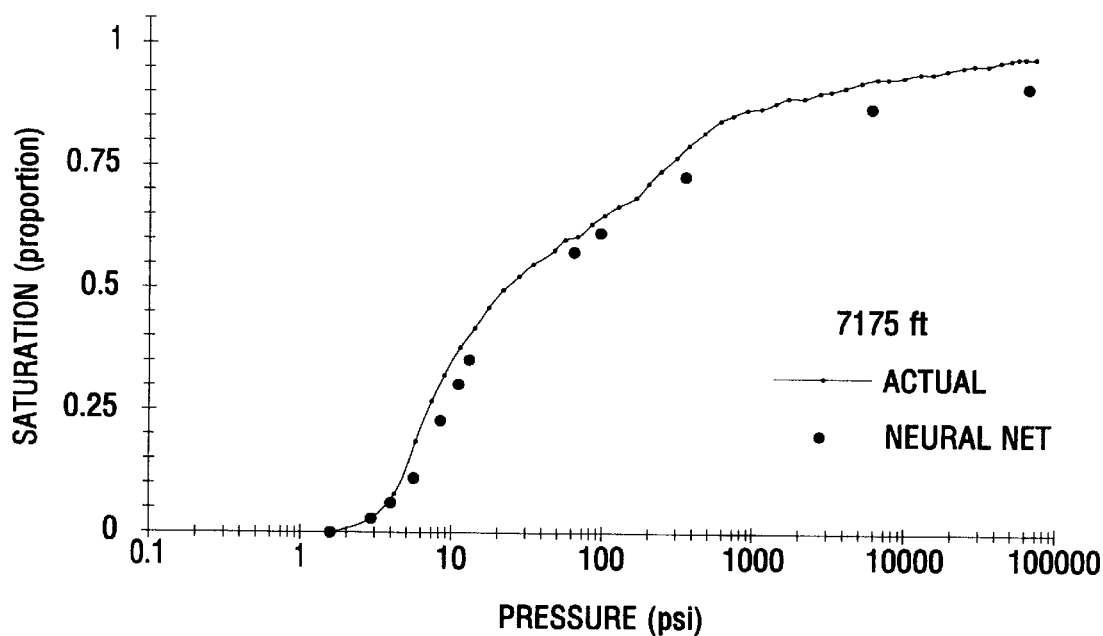
FIG. 11 is a graphical representation at a depth of 7175 ft. in a drilled well showing the fit between laboratory measured and neural network derived capillary pressure curves for core samples used to train the neural network.
Figure 12:
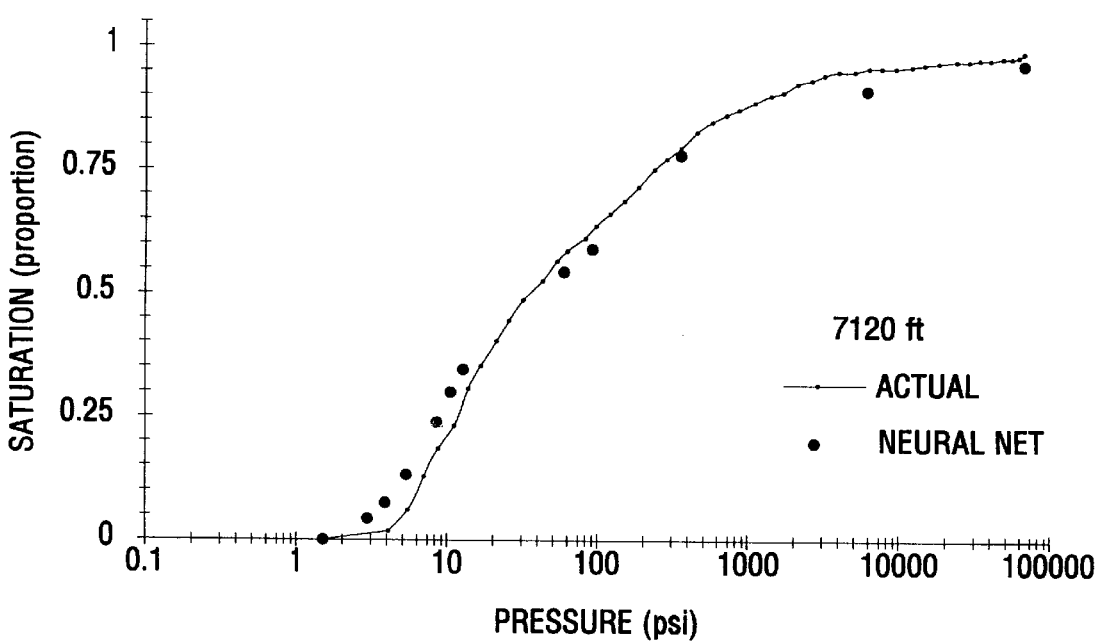
FIG. 12 is a graphical representation at a depth of 7210 ft. in a drilled well showing the fit between laboratory measurements and neural network derived capillary pressure curves for core samples used to train the neural network.
Figure 13:
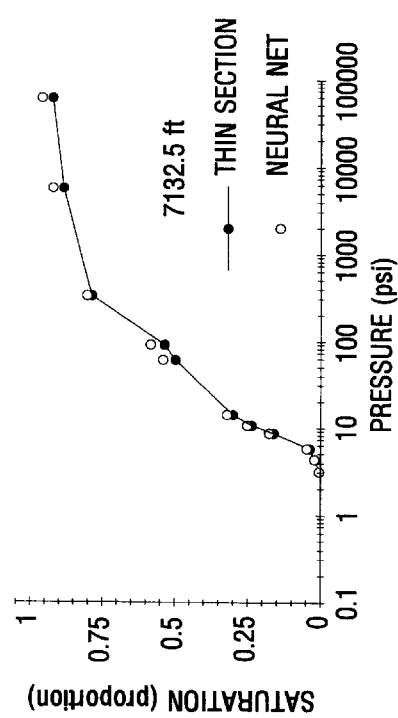
FIG. 13 to FIG. 16 are graphical representations over the depth interval from 7111 ft. to 7209 ft. in the same drilled well on FIGS. 9–12 showing thin section measured and neural network derived capillary pressure curves for samples used to train the neural network.
Figure 14:
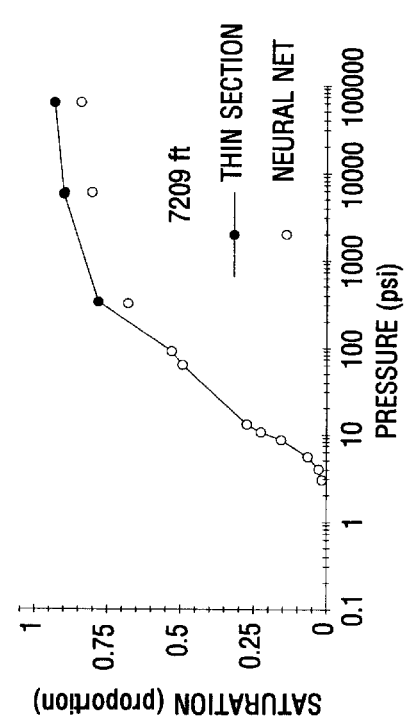
Figure 15:
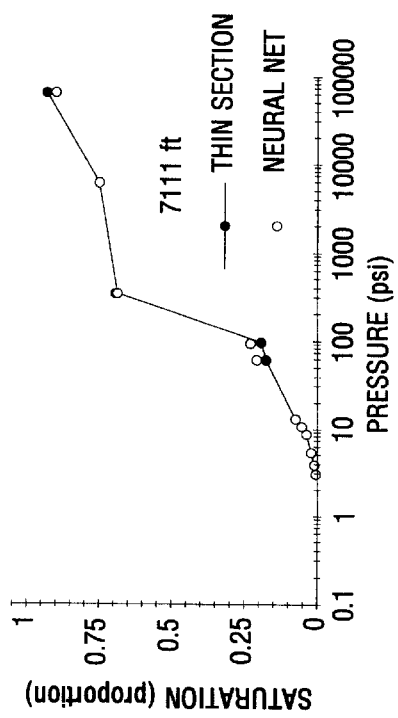
Figure 16:
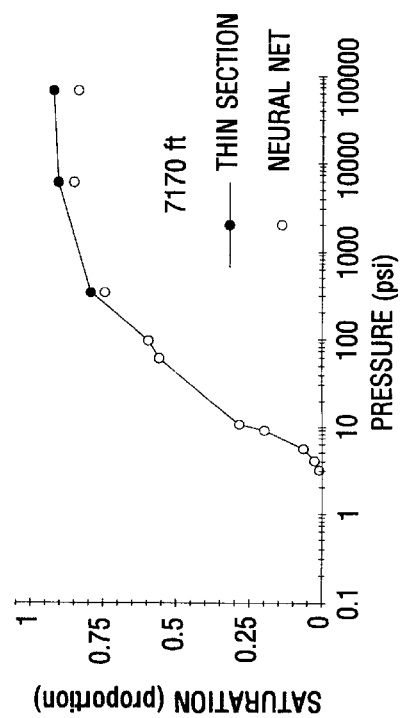

Following the above stated procedures, an example of using wireline log data in known wells to predict properties desired to be known from wireline logs run in new wells in the field by use of a trained neural network is shown in FIG. 5–20 of the drawings. In these figures FIG. 5 and 6 are from the Neural Network evaluation stage. They show measured porosity and permeability vs. Neural Network porosity and permeability for actual cases used to train the Neural Network. Similarly FIGS. 7 and 8 illustrate pore types PT-3 and PT-4 (as defined in Table I) from observation of cores microscopically with these pore types predicted by the Neural Network, again for cores used to train the network. Similar curves would occur for the other pore types PT-1, PT-2, and PT-5.

FIGS. 9, 10, 11 and 12 show for different depths (from 7123 ft to 7210 ft. in a given well) the fit between the measured (solid line) and Neural Network predicted (dots) capillary pressure curves for the core samples used to train the Neural Network and based on the capillary pressure model defined in Table III.

FIGS. 13, 14, 15 and 16 show for roughly the same depth interval as FIGS. 9, 10, 11 and 12 the fit between the thin section derived laboratory measurements from actual cores (black dots) vs. neural network derived (open dots) capillary pressure curves also from rock samples used to train the Neural Network.

Figure 17:
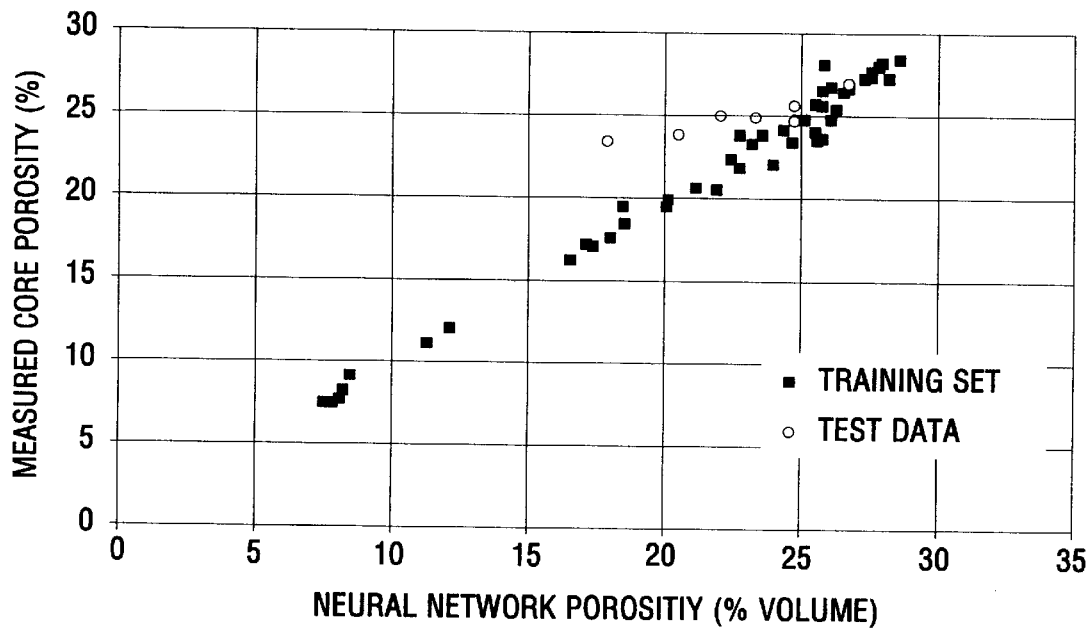
FIG. 17 and FIG. 18 are graphical cross plot representations of measured core porosities and permeabilities vs. neural network derived core porosities and permeabilities for samples from the same drilled well which were not used to train the neural network.
Figure 18:
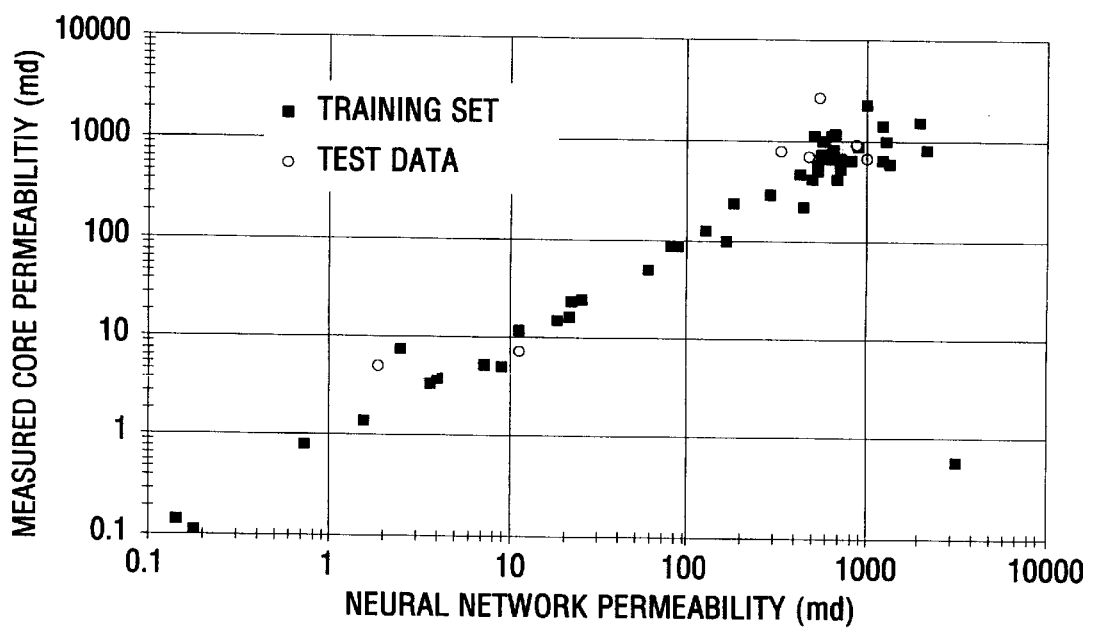
Figure 19:
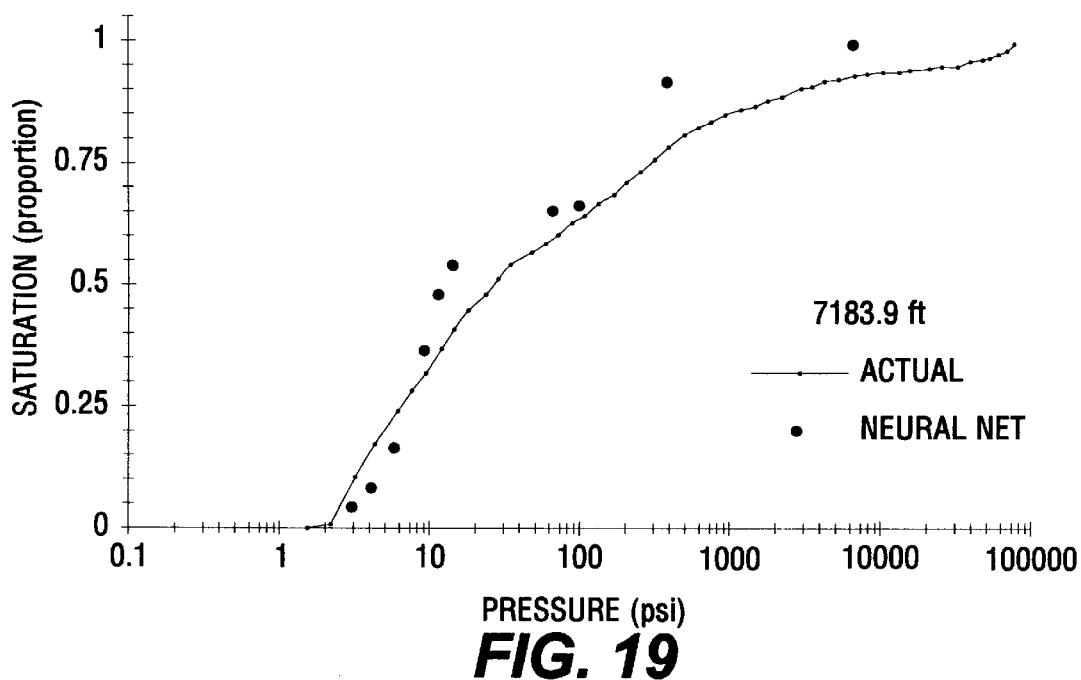
FIG. 19 and FIG. 20 are graphical representations at depths of 7183.9 ft. and 7184.5 ft. in the same drilled well showing laboratory derived vs. neural network derived capillary pressure curves for rock samples not used to train the neural network.
Figure 20:
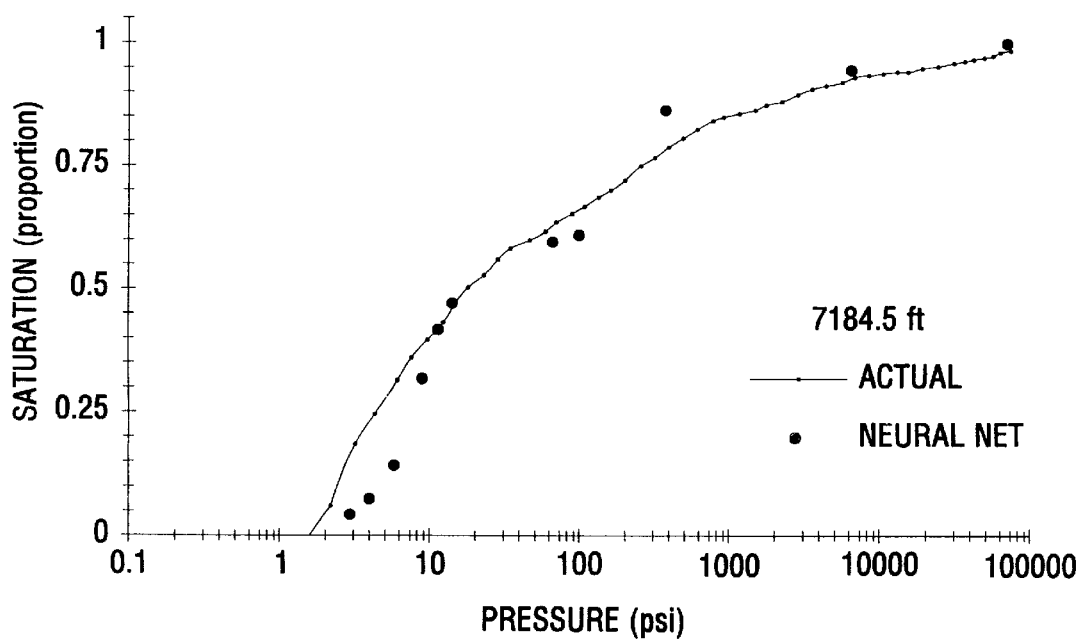

Finally, FIGS. 17 and 18 reveal the fit between measured (solid dots) and synthetic Neural Network predicted (open dots) porosities and permeabilities from core samples (from the same well) but which were not used to train the neural network. Similarly, FIGS. 19 and 20 reveal the fit between measured (solid line) and synthetic Neural Network predicted capillary pressure curves (using the model of Table III) from cores from the same well, but which were not used to train the Neural Network).

The excellent agreement of the fits between actual physical measurement and observations of the pore types, porosities, permeabilities and capillary pressure curves from FIGS. 5 through 20 provide strong evidence of the usefulness of the Neural Network technique. While all of these figures do refer to samples and data from a single well, it is apparent that these techniques should be equally valid when applied to other wells in the same field and even from other wells geographically related and having the same general type of geological disposition.

The foregoing description and explanation may make apparent to those of skill in the art certain changes and modifications of the invention. It is, however, the aim of the appended claims to cover all such changes and modifications which fall within the true spirit and scope of the invention.

We claim:

1. A method for determining the pore type of earth formations penetrated by a well borehole from plural wireline well logs of the well borehole, comprising the steps of:

providing a neural network having an input layer, at least two hidden layers for receiving signals from said input layer and an output layer for receiving signals from the hidden layers, said neural network layers being fully interconnected;

selecting core samples from the same depth intervals as wireline well logs which have been run, said core samples representing all lithological variations and all distinct wireline log response intervals, and measuring on each of said selected core samples porosity, permeability and capillary pressure;

analyzing two dimensional pore size and shape data from thin section images corresponding to said selected core samples, said images being generated by a petrographic microscope and defining therefrom plural distinct pore types for the well;

training said neural network by inputting, depth aligned with core samples, wireline log data to said input layer, comparing with measured core sample data using the iterative back propagation training technique to produce synthetic output data, said measured data and said synthetic output data comprising pore type proportion, porosity, permeability and capillary pressure, validating the trained neural network by using wireline log input data and producing synthetic output data from well depths not used to train the neural network but for which measured core sample data is available; and applying the trained, validated neural network to wireline log data from other depth intervals of the well for which no core samples were measured to produce synthetic outputs of pore type proportions.

2. The method of claim 1 wherein at least six independent wireline log and measurement data are utilized to provide the neural network.

3. The method of claim 2 wherein said at least six independent wireline log data comprise a deep induction (ILD), a medium induction (ILM), a shallow conductivity (MSFL), a bulk density (RHOB), a neutron porosity (NPHI), and an acoustic travel time (DT).

4. The method of claim 1 wherein said training step comprises a minimum of one hundred thousand iterations of back propagation technique comparing actual measured core data and synthetic neural network generated data.

5. The method of claim 1 wherein the step of analyzing two dimensional pore size and shape from thin section images is performed alternatively on images produced by an electron microscope.

6. A method for determining pore types and capillary pressure curve data of earth formations penetrated by a well borehole from plural wireline well logs, comprising the steps of:

providing a neural network having an input layer, at least two hidden layers for receiving signals from said input layer and an output layer for receiving signals from the hidden layers, said neural network layers being fully interconnected;

selecting core samples from the same depth interval as wireline well logs which have been run, said core samples representing all lithological variation and all distinct wireline log response intervals, and measuring each of said selected core samples porosity, permeability and capillary pressure curve data;

analyzing two dimensional pre size and shape data from thin section images corresponding to said selected core samples, said images being generated by a petrographic microscope and defining therefrom plural distinct pore types for the well;

measuring capillary pressure curve data for said selected core samples as a function of pore type proportion to relate the change in fluid saturation between any capillary pressure inflection points which may occur to the pore type proportion using multiple regression analysis;

generating a capillary pressure curve data model by selecting an appropriate regression equation for each pressure interval as a function of pore type proportion and validating the accuracy of this model by comparing with data from core samples from the same well not used to build the model;

training said neural network by inputting wireline data depth aligned with core samples to said input layer and comparing with measured core sample data using the iterative back propagation training technique to produce synthetic output data, said measured data and said synthetic output data comprising pore types proportion, porosity and permeability;

validating the trained neural network by using wireline log input data and producing synthetic output data for well depths not used to train the neural network but for which measured core sample data is available;

applying the trained, validated neural network to wireline log data from other sections of the well for which no core samples were measured to produce synthetic outputs of pore type proportions, porosity and permeability; and deriving from said synthetic pore type proportions and said capillary pressure curve data model synthetic capillary pressure curve data as a function of depth for the well and recording said synthetic capillary pressure data as a function of depth.

7. The method of claim 6 and further including the steps of plotting pressure intervals and predicted cumulative fluid saturation values for each synthetic capillary pressure curve.

8. The method of claim 7 and further including the step of deriving as a function of borehole depth a synthetic pore type volume by forming a predetermined function of synthetic pore type proportions multiplied by synthetic porosity and recording said synthetic pore type volume as a function of depth.

9. The method of claim 8 and further including the step of zoning reservoir intervals in the well borehole as a function of pore type assemblages.

10. The method of claim 6 wherein at least six independent wireline log data are utilized to provide the neural network.

11. The method of claim 10 wherein said at least six independent wireline log data and core sample measurement data are utilized to provide the neural network.

12. The method of claim 10 wherein said at least six independent wireline log data comprise a deep induction (ILD), a shallow conductivity (MSFL), a medium induction (ILM), a bulk density (RHOB), a neutron porosity (NPHI), and an acoustic travel time (DT).

13. The method of claim 6 wherein said training step comprises a minimum of one hundred thousand iterations of back propagation technique comparing actual measured core data and synthetic neural network generated data.

14. The method of claim 6 wherein the step of analyzing two dimensional pore size and shape from thin section images is performed alternatively on images produced by an electron microscope.

* * * * *